(12) United States Patent
Sasaoka

(10) Patent No.: US 7,690,685 B2
(45) Date of Patent: Apr. 6, 2010

(54) VEHICLE STEERING MECHANISM

(75) Inventor: Masayuki Sasaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 11/811,500

(22) Filed: Jun. 11, 2007

(65) Prior Publication Data

US 2007/0284839 A1 Dec. 13, 2007

(30) Foreign Application Priority Data

Jun. 12, 2006 (JP) .............................. 2006-162654

(51) Int. Cl.
*B62D 7/00* (2006.01)
(52) U.S. Cl. .......................... 280/771; 280/98; 280/513
(58) Field of Classification Search ............ 280/93.513, 280/771, 93.502, 93.51, 93.511, 89.12, 98–102; 180/6.24, 6.38, 411, 431
See application file for complete search history.

(56) References Cited

U.S. PATENT DOCUMENTS

| 736,192 | A | * | 8/1903 | Barber | 280/795 |
|---|---|---|---|---|---|
| 1,050,810 | A | * | 1/1913 | Cowles | 280/93.511 |
| 1,170,270 | A | * | 2/1916 | Johnson | 180/253 |
| 1,461,965 | A | * | 7/1923 | Bolte | 280/124.113 |
| 1,502,237 | A | * | 7/1924 | Drescher | 414/555 |
| 1,748,061 | A | * | 2/1930 | Claude | 280/93.513 |
| 2,175,429 | A | * | 10/1939 | Chayne | 280/93.511 |
| 2,227,521 | A | * | 1/1941 | Utz | 280/93.508 |
| 3,528,682 | A | * | 9/1970 | Lohr et al. | 280/211 |
| 3,822,759 | A | * | 7/1974 | Sheppard | 180/431 |
| 4,441,735 | A | * | 4/1984 | Hutchison et al. | 280/771 |
| 5,154,437 | A | * | 10/1992 | Inagaki et al. | 180/411 |
| 5,788,276 | A | * | 8/1998 | Yamanaka et al. | 280/771 |
| 6,196,563 | B1 | * | 3/2001 | Haycraft | 280/93.512 |
| 6,719,311 | B2 | * | 4/2004 | Davis et al. | 280/93.502 |
| 6,921,109 | B2 | * | 7/2005 | Hutchison et al. | 280/771 |
| 6,951,259 | B2 | * | 10/2005 | Irikura | 180/6.3 |
| 7,044,244 | B2 | * | 5/2006 | Irikura | 180/6.26 |
| 7,159,903 | B2 | * | 1/2007 | Huang | 280/771 |
| 7,192,040 | B2 | * | 3/2007 | Xie | 280/93.502 |
| 7,458,431 | B2 | * | 12/2008 | Irikura | 180/6.26 |
| 7,493,975 | B2 | * | 2/2009 | Irikura | 180/6.32 |
| 2002/0121758 | A1 | * | 9/2002 | Davis et al. | 280/93.502 |
| 2003/0106725 | A1 | * | 6/2003 | Irikura | 180/6.26 |
| 2005/0134014 | A1 | * | 6/2005 | Xie | 280/93.502 |
| 2006/0043690 | A1 | * | 3/2006 | Pankau | 280/93.502 |
| 2006/0232035 | A1 | * | 10/2006 | Lambert | 280/93.502 |
| 2007/0144796 | A1 | * | 6/2007 | Schaedler et al. | 180/6.24 |
| 2008/0184687 | A1 | * | 8/2008 | Scherbring et al. | 56/10.1 |

FOREIGN PATENT DOCUMENTS

| JP | 02-014974 | 1/1990 |
|---|---|---|
| JP | 2655684 | 9/1997 |
| WO | WO 2007/014030 A | 2/2007 |

* cited by examiner

*Primary Examiner*—Paul N Dickson
*Assistant Examiner*—Jordan Golomb
(74) *Attorney, Agent, or Firm*—Carrier, Blackman & Associates, P.C.; William D. Blackman; Joseph P. Carrier

(57) ABSTRACT

A steering mechanism of a vehicle has a suspension arm, and steering acceleration gear mechanisms for steering left and right front wheels provided to either end of the suspension arm. A portion of the suspension arm protrudes further forwardly of the vehicle than the steering acceleration gear mechanisms, so that the steering acceleration gear mechanisms including knuckle arms are protected from obstructions.

5 Claims, 9 Drawing Sheets

VEHICLE STEERING MECHANISM

FIELD OF THE INVENTION

The present invention relates to a vehicle steering mechanism provided with a tie rod and a knuckle arm for steering left and right wheels.

BACKGROUND OF THE INVENTION

Japanese Patent No. 2655684 discloses an example of a vehicle steering mechanism for steering left and right wheels via an accelerating gear by operating a steering wheel. FIG. 9 hereof shows the steering mechanism disclosed in Japanese Patent No. 2655684.

The vehicle steering mechanism 201 shown in FIG. 9 has left and right accelerating gears 204, 204 driven by a worm gear 203 connected to a steering wheel 202. Left and right wheels 205, 205 are steered via the left and right accelerating gears 204, 204. A tie rod 207 connects left and right knuckle arms 206, 206 fixed on the left and right accelerating gears 204, 204.

However, a risk is presented in that obstructions located to the front of the steering mechanism 201 may come into contact with the steering apparatus, which includes the knuckle arms 206 and tie rod 207 that transmit steering force from the steering wheel 202 to the front wheels 205, 205. As is particularly so with work vehicles, the steering apparatus often comes into contact with obstructions because the vehicle travels in locations where the ground is uneven and vegetation grows.

It is therefore necessary to provide a vehicle steering mechanism that protects steering acceleration gear mechanisms and knuckle arms from obstructions.

SUMMARY OF THE INVENTION

According to the present invention, there is provided a vehicle steering mechanism which comprises: a suspension arm extending transversely of a vehicle; and steering acceleration gear mechanisms mounted on left and right ends of the suspension arm and designed to steer wheels via a force from a steering wheel, wherein each steering acceleration gear mechanism includes: an input gear mounted on a left or right end of the suspension arm; an output gear that meshes with the input gear and has a smaller radius than that of the input gear; and a knuckle arm to which the force from the steering wheel is transmitted to rotate the input gear, the suspension arm having a portion protruding further forwardly of the vehicle than the steering acceleration gear mechanisms.

The suspension arm accordingly protects the steering acceleration gear mechanisms from obstructions located to the front of the vehicle.

Preferably, the suspension arm has a central arm part designed to be connected to the vehicle frame, and side arm parts mounted on the left and right ends of the central arm part, the side arm parts being U-shaped as viewed in top plan so as to provide clearance around the knuckle arm, one leg part of the side arm part being mounted to an input bearing boss that accommodates an input shaft serving as a rotational center of the input gear, the other leg part of the side arm part being mounted to an output bearing boss that accommodates an output shaft that is the rotational center of the output gear, the side arm parts protruding further forwardly of the vehicle than the steering acceleration gear mechanisms.

With this arrangement, the side arm parts come in contact with obstructions located to the front and protect the knuckle arm and other steering acceleration gear mechanisms from the obstructions.

Desirably, the knuckle arm is disposed in a space formed closely to a lower end of the input bearing boss between the input bearing boss and the output bearing boss. As a result, the knuckle arm part is protected from obstructions located to the front.

In a preferred form, the lower end of the side arm part is located in a position equivalent to the height of the knuckle arm above the ground. As a result, the side arm part can more reliably protect the knuckle arm from obstructions located to the front.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
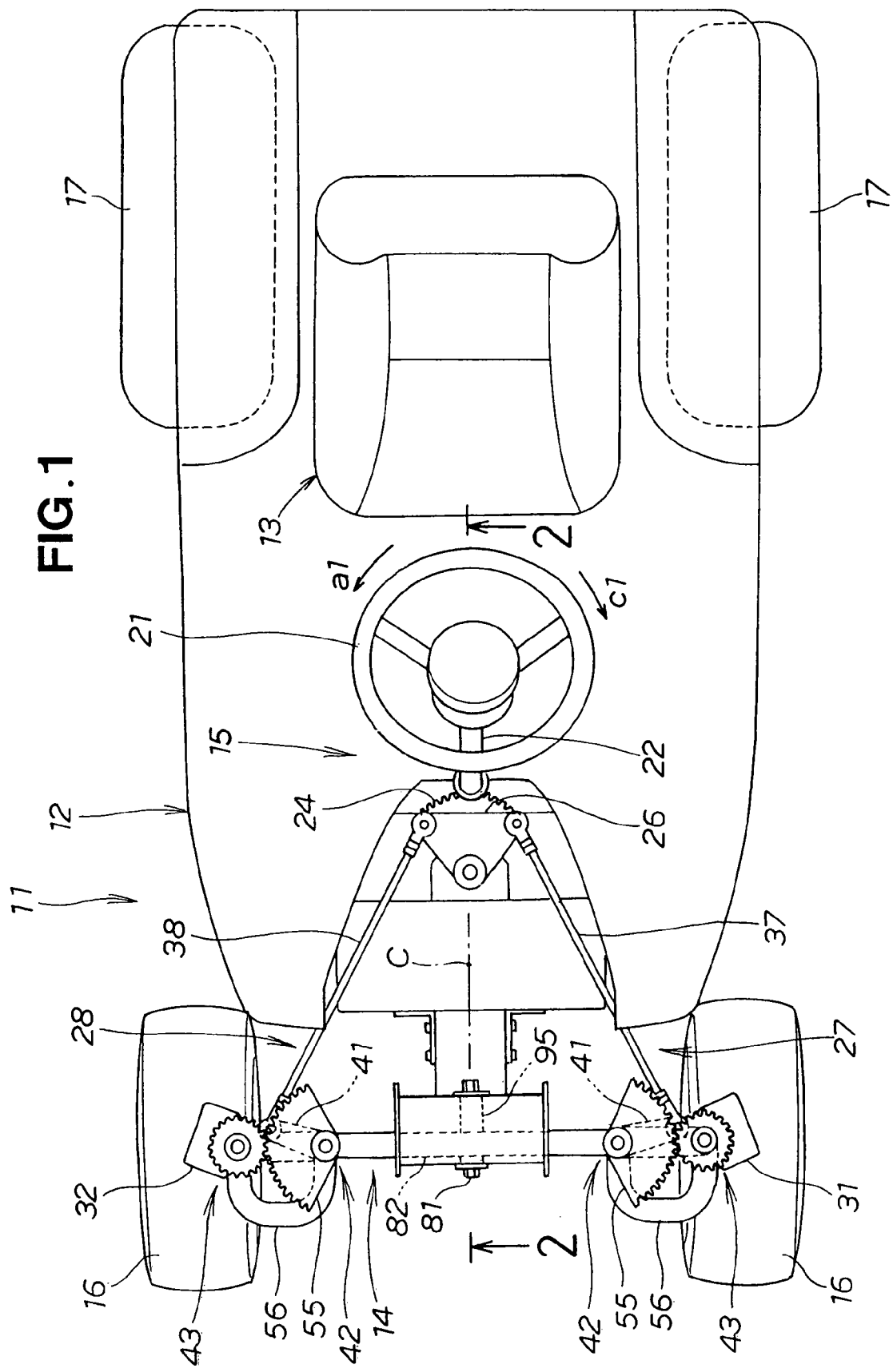
FIG. 1 is a top plan view of a vehicle employing a steering mechanism according to the present invention.

Reference is now made to FIG. 1 showing a vehicle 11, employing a steering mechanism according to the present invention, which is used as a riding lawnmower. The vehicle 11, has a vehicle frame 12, an operator seat 13, a suspension arm 14 mounted on the front part of the vehicle frame 12; a steering mechanism (wide-angle steering mechanism) 15 mounted on the suspension arm 14; left and right front wheels 16, 16 supported by the steering mechanism 15; and left and right rear wheels 17 supported by the vehicle frame 12.

Figure 2:
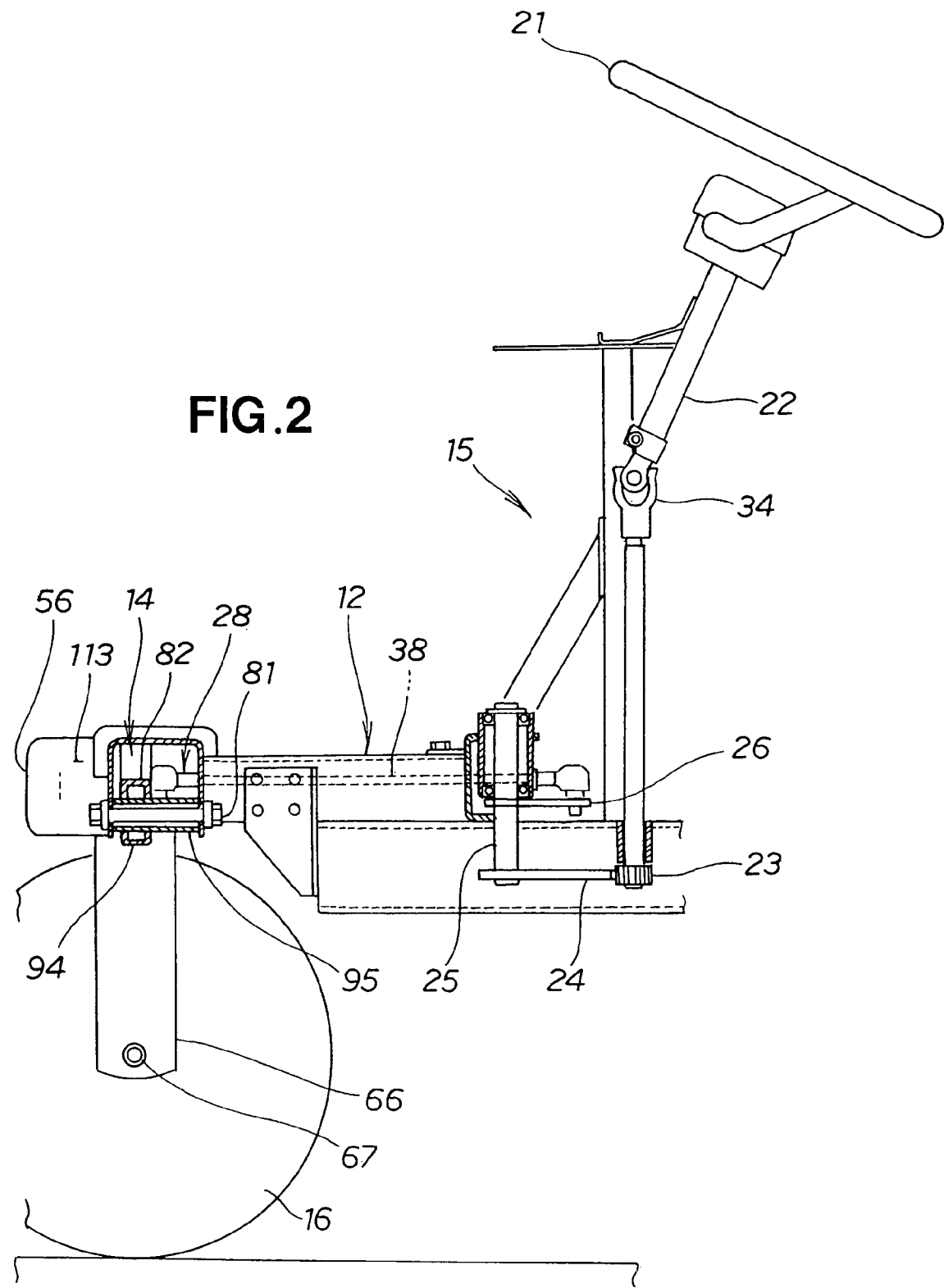
FIG. 2 is a cross-sectional view taken along line 2-2 of FIG. 1.

The description below is provided with reference to FIGS. 1, 2, and 3. The steering mechanism 15 comprises a steering wheel 21 mounted on the vehicle frame 12. A steering shaft 22 connected to the steering wheel 21 is rotatably mounted on the vehicle frame 12. The steering shaft 22 has a first steering gear 23 fitted on the lower end thereof. The first steering gear 23 meshes with a fan-shaped second steering gear 24 (see FIG. 6). The second steering gear 24 is supported by a steering gear shaft 25. Left and right steering acceleration gear mechanisms 27, 28 are connected to a triangular connecting plate 26 that is fixed to the steering gear shaft 25. A left steering stopper 31 is mounted on the left steering acceleration gear mechanism 27. A right steering stopper 32 is mounted on the right steering acceleration gear mechanism 28.

The left steering acceleration gear mechanism 27 and the right steering acceleration gear mechanism 28 have the same structure and have bilateral symmetry across a center line C in the width direction of the vehicle.

The steering shaft 22 is rotatably supported by the vehicle frame 12 and has a universal joint 34 in the middle of the shaft.

The upper portion of the steering gear shaft 25 is rotatably supported by the vehicle frame 12 via a bearing. The fan-shaped second steering gear 24 is mounted on the lower end of the steering gear shaft, and the triangular connecting plate 26 is mounted in the center part of the steering gear shaft.

The connecting plate 26 has left and right connecting parts 35, 36. A first push-pull rod 37 of the left steering acceleration gear mechanism 27 is connected to the left connecting part 35. A second push-pull rod 38 of the right steering acceleration gear mechanism 28 is connected to the right connecting part 36.

The left steering acceleration gear mechanism 27 comprises the first push-pull rod 37, a left knuckle arm 41 to which the first push-pull rod 37 is connected, a left input gear mechanism 42 provided with the knuckle arm 41, and a left output gear structure 43 to which force from the input gear mechanism 42 is transmitted.

In the left input gear mechanism 42, an input bearing boss 51 is mounted on an end of the suspension arm 14 near the widthwise center of the vehicle, and an input shaft 52 is rotatably fitted into a hole of the input bearing boss 51. The knuckle arm 41 is welded or otherwise fixed to the bottom end of the input shaft 52, and a knuckle mounting part 53 is formed. A gear fitting 54 is formed at the top end of the input shaft 52, and a fan-shaped input gear 55 is fitted onto the gear fitting 54.

In the left output gear structure 43, an output bearing boss 57 is mounted on the input bearing boss 51 of the left input gear mechanism 42 via a side arm 56. An output shaft 58 is rotatably fitted into a hole of the output bearing boss 57. A gear fitting 61 is formed on the top end of the output shaft 58, an output gear 62 is fitted onto the gear fitting 61, and a wheel connecting part 64 on which a wheel support mechanism 63 is mounted is formed on the bottom end of the output shaft 58.

The output gear 62 meshes with the input gear 55, and is designed so that the radius of the output gear 62 is smaller than that of the fan-shaped input gear 55.

The wheel support mechanism 63 comprises an L-shaped axle fixing member 66 fixed to the wheel connecting part 64 on the bottom end of the output shaft 58, and an axle main body 67 welded or otherwise fixed to the axle fixing member 66. The front wheels 16 are rotatably mounted on the axle main body 67.

The axle fixing member 66 has a mounting part 68 fixed to the output shaft 58 and positioned above the front wheels 16, and butting parts 69 are present on either edge of the mounting parts 68 positioned to the front and rear. The left butting part 69 comes into contact with the left steering stopper 31 so that steering is stopped when the steering wheel 21 is turned to the fullest extent. Therefore, the left axle fixing member 66 is stopped by the left steering stopper 31. The right butting member 69 comes into contact with the right steering stopper 32, and steering is stopped. Therefore, the right axle fixing member 66 is stopped by the right steering stopper 32.

In the left steering stopper 31, a plate-shaped main body 71 is fixed to the bottom end of the output bearing boss 57 provided with the left steering acceleration gear mechanism 27. A left-turn-limiting convexity 72 is provided to the front end of the main body 71, and a right-turn-limiting convexity 73 (see FIG. 4) is provided to the rear end of the main body. Furthermore, the left-turn-limiting convexity 72 and the right-turn-limiting convexity 73 are disposed away from the steering acceleration gear mechanism 27.

The right steering stopper 32 is symmetrical to the left steering stopper 31, and a left turn-limiting convexity 72 (see FIG. 4) is provided to the rear end of the main body 71, and a right turn-limiting convexity 73 is provided to the front end of the main body.

The suspension arm 14 is provided with a center arm 82 mounted on the vehicle frame 12 via a bolt 81 so as to freely oscillate in the width direction of the vehicle, left and right side arms 56, 56 mounted on either end of the center arm 82, and a beam member 83. The input bearing boss 51 is fixed to one end of the left and right side arms 56, 56, and the output bearing boss 57 is fixed to the other end. The beam member 83 is fixed between the top parts of the input bearing boss 51 and the output bearing boss 57.

The following is a description of the operation of the steering mechanism 15 when the vehicle 11 is turned left or turned right. FIG. 4 shows the steering mechanism when the vehicle is turned left, and shows a state of a minimum turning radius. A description shall be made with reference to FIGS. 1 to 3. In FIG. 4, the input gears 55, 55 and output gears 62, 62 are indicated by the double-dashed lines in order to clearly show the movement of the knuckle arms 41, 41. First, a case in which the vehicle is turned left will be described.

When the steering wheel 21 is rotated counter clockwise as shown by arrow a1, the fan-shaped second steering gear 24 rotates clockwise as shown by the arrow a2. The first push-pull rod 37 pushes the left knuckle arm 41 forward via the connecting plate 26, as shown by arrow a3. Therefore, the input gear 55 of the left steering acceleration gear mechanism 27 rotates clockwise as shown by arrow a4. The output gear 62 of the left output gear structure 43 rotates counter-clockwise as shown by arrow a5. The output gear 62 rotates, whereby the left axle fixing member 66 rotates in the same direction as the output gear 62, as shown by arrow a6. The left front wheel 16 is steered from the straight-ahead position Sh to the left turn limit position Mhh. In this case, the right front wheel 16 is similarly steered from the straight ahead position Sr to the left turn limit position Mrh. Therefore, the vehicle turns left as shown by arrow a7.

Specifically, when the steering wheel 21 is rotated counterclockwise as shown by the arrow a1, the second push-pull rod 38 pulls the right knuckle arm 41 via the connecting plate 26 as shown by the arrow b1. Therefore, the input gear 55 of the right steering acceleration gear mechanism 28 rotates clockwise as shown by the arrow b2. The output gear 62 of the right output gear structure 43 rotates counterclockwise as shown by the arrow b3. The right axle fixing member 66 rotates in the same direction as the output gear 62 as a result of the rotation of the output gear 62, and the right front wheel 16 is steered from the straight ahead position Sr to the left turn limit position Mrh.

Figure 5:
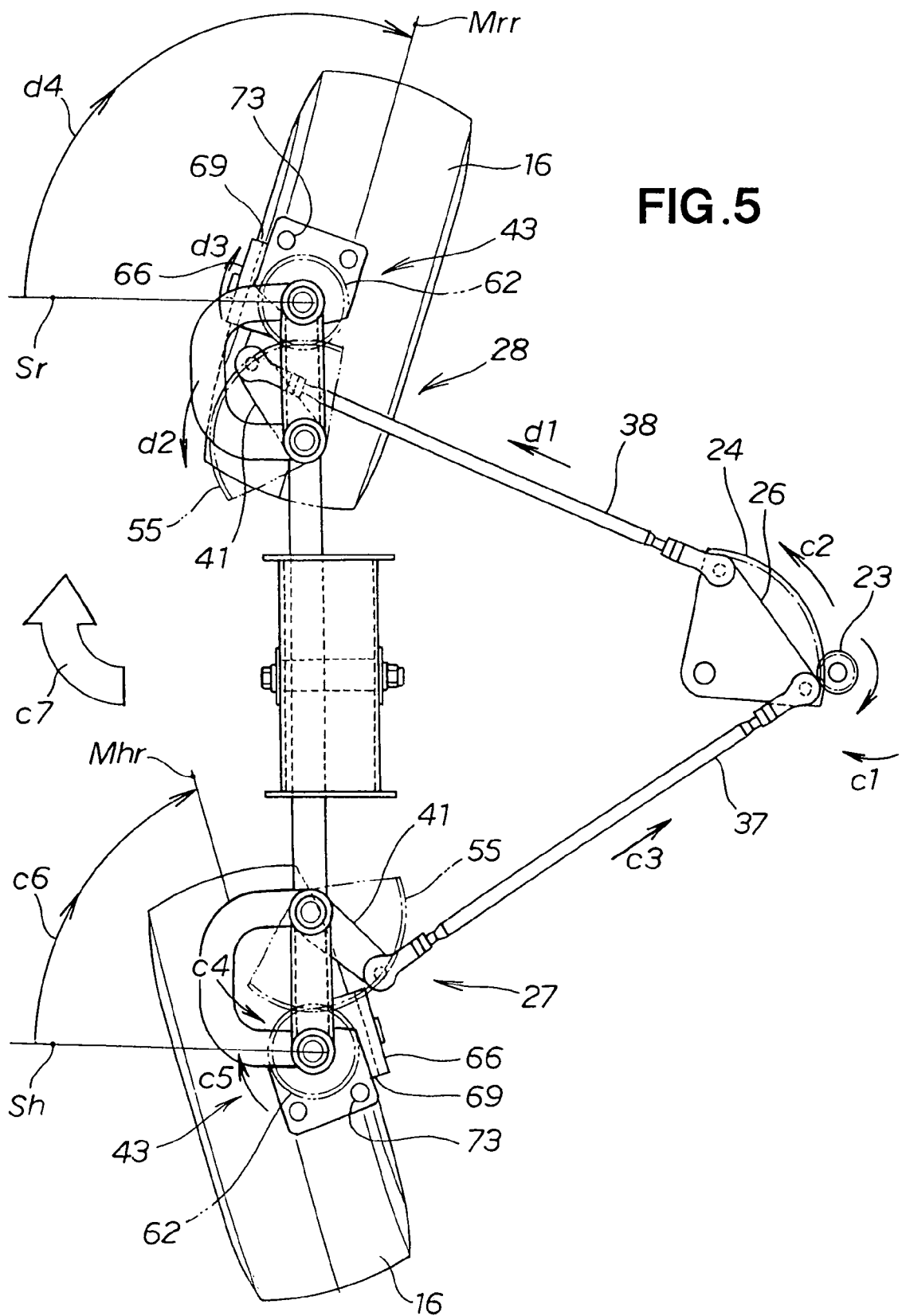
FIG. 5 is a top plan view showing the steering mechanism as the vehicle is turned right.

An operation upon turning to the right of the vehicle will be described next with reference to FIG. 5.

When the steering wheel 21 is rotated clockwise as shown by the arrow c1, the fan-shaped second steering gear 24 rotates counterclockwise as shown by the arrow c2. The first push-pull rod 37 pulls the left knuckle arm 41 via the connecting plate 26 as shown by the arrow c3. The input gear 55 of the left steering acceleration gear mechanism 27 therefore rotates counterclockwise as shown by the arrow c4. The output gear 62 of the left output gear mechanism 43 rotates counterclockwise as shown by the arrow c5. As a result of the rotation of the output gear 62, the left axle fixing member 66 rotates in the same direction as the output gear 62 as shown by the arrow c6, and the left front wheel 16 is steered from the straight ahead position Sh to the right turn limit position Mhr. In this case, the right front wheel 16 is similarly steered from the straight ahead position Sr to the right turn limit position Mrr, and the vehicle 11 therefore turns right as shown by the arrow c7.

Specifically, when the steering wheel 21 is rotated clockwise as shown by the arrow c1, the second push-pull rod 38 pushes the right knuckle arm 41 forward via the connecting plate 26 as shown by the arrow d1. Therefore, the input gear 55 of the right steering acceleration gear mechanism 28 rotates counterclockwise as shown by the arrow d2. The output gear 62 of the right output gear mechanism 43 rotates clockwise as shown by the arrow d3. As a result of the rotation of the output gear 62, the right axle fixing member 66 rotates in the same direction as the output gear 62, and the right front wheel 16 is steered from the straight ahead position Sr to the right turn limit position Mrr as shown by the arrow d4.

Figure 6:
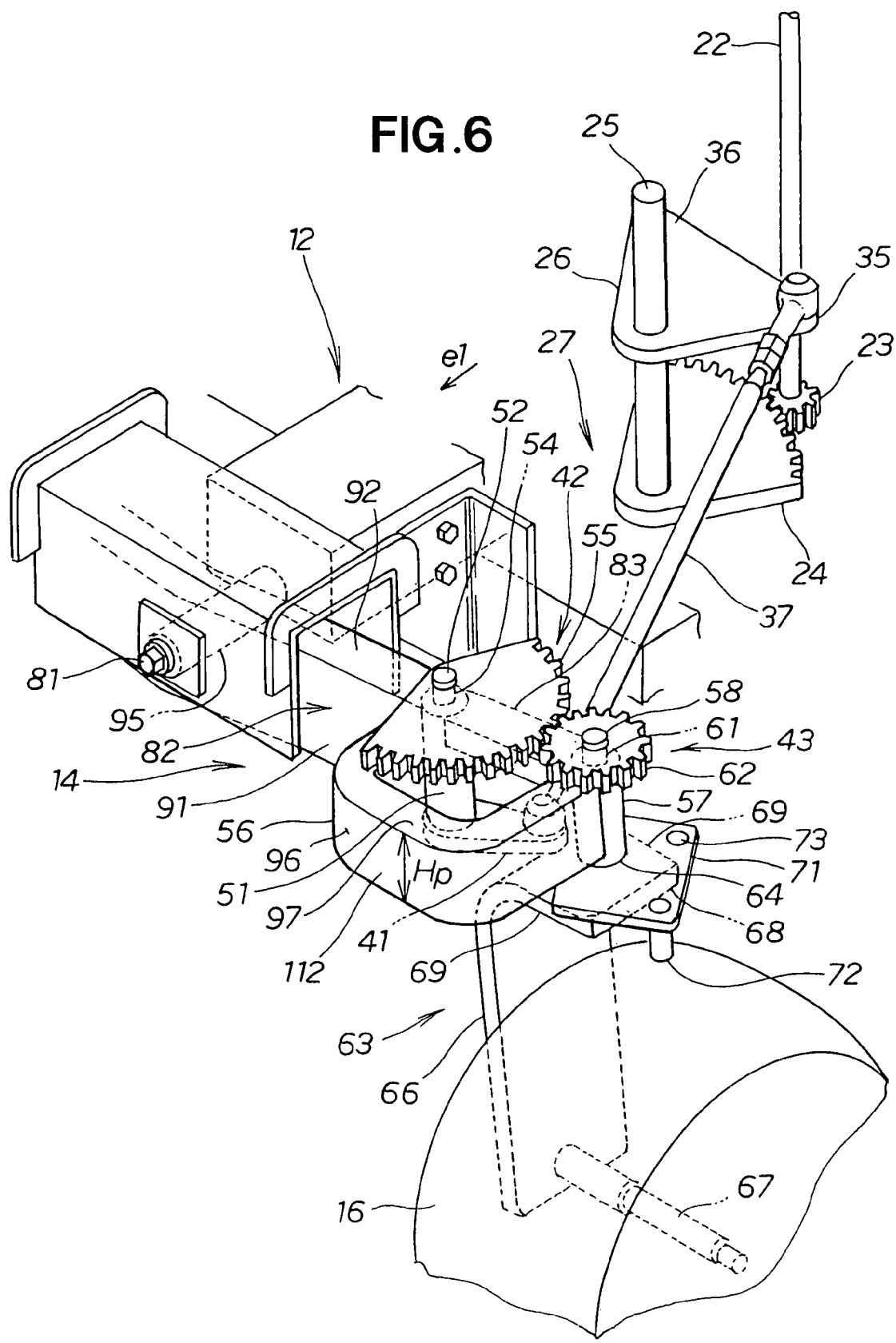
FIG. 6 is a perspective view showing the left steering acceleration gear mechanism shown in FIG. 3.
Figure 7:
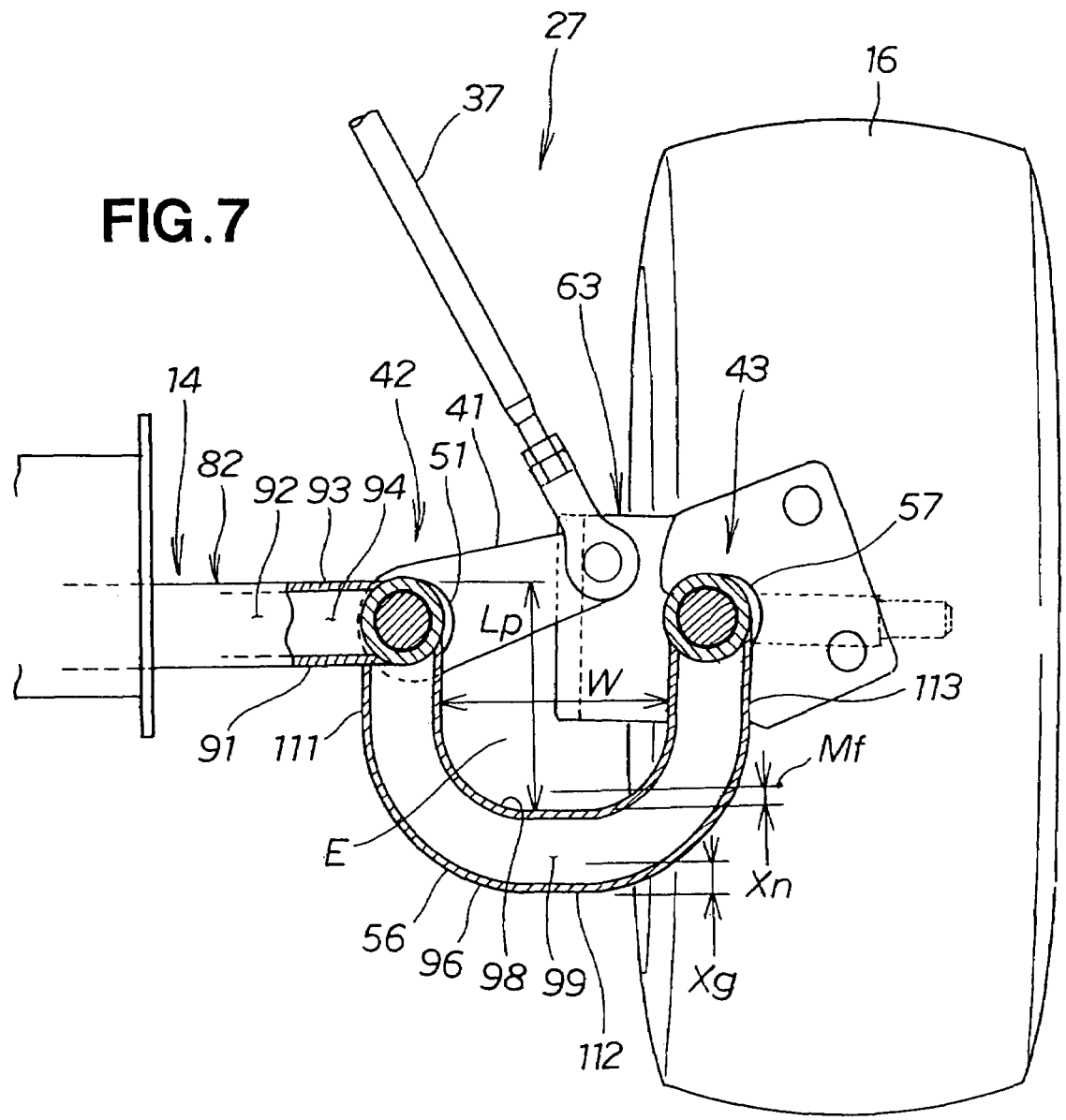
FIG. 7 is a cross-sectional view taken along line 7-7 of FIG. 3.

Referring to FIGS. 6 and 7, description will be made next as to the suspension arm 14 and the left steering acceleration gear mechanism 27.

The suspension arm 14 comprises the center arm 82 and the left and right side arms 56. The center arm 82 has a closed cross-sectional shape describing a rectangular tube formed by first through fourth side walls 91 to 94. The portion of the first and third side walls 91, 93 positioned midway along the widthwise direction of the vehicle is mounted to the vehicle frame 12 by shaft part 95 through which bolts 81 are screwed. The center arm 82 is supported so as to freely oscillate around the shaft part 95 in the widthwise direction of the vehicle. The left and right side arms 56, 56 are positioned on either end of the center arm 82.

The side arms 56 describe a dosed cross-sectional shape comprising first through fourth walls 96 to 99. The side arms 56 have a U-shape as viewed from above, and protrude toward the forward direction of the vehicle 11. Input side leg parts 111 positioned inside the U-shaped side arms 56 are mounted on the center arm 82 via the input bearing boss 51. Output side leg parts 113 positioned outside of the side arms 56 support the output bearing bosses 57 of the output gear structures 43. Protecting parts 112 that are parallel to the widthwise direction of the vehicle are formed between the front end parts of the input side leg parts 111 and the output side leg parts 113. The protecting parts 112 are separated from the turn limit position Mf of the knuckle arms 41 by a distance Xn toward the forward direction of the vehicle.

Figure 3:
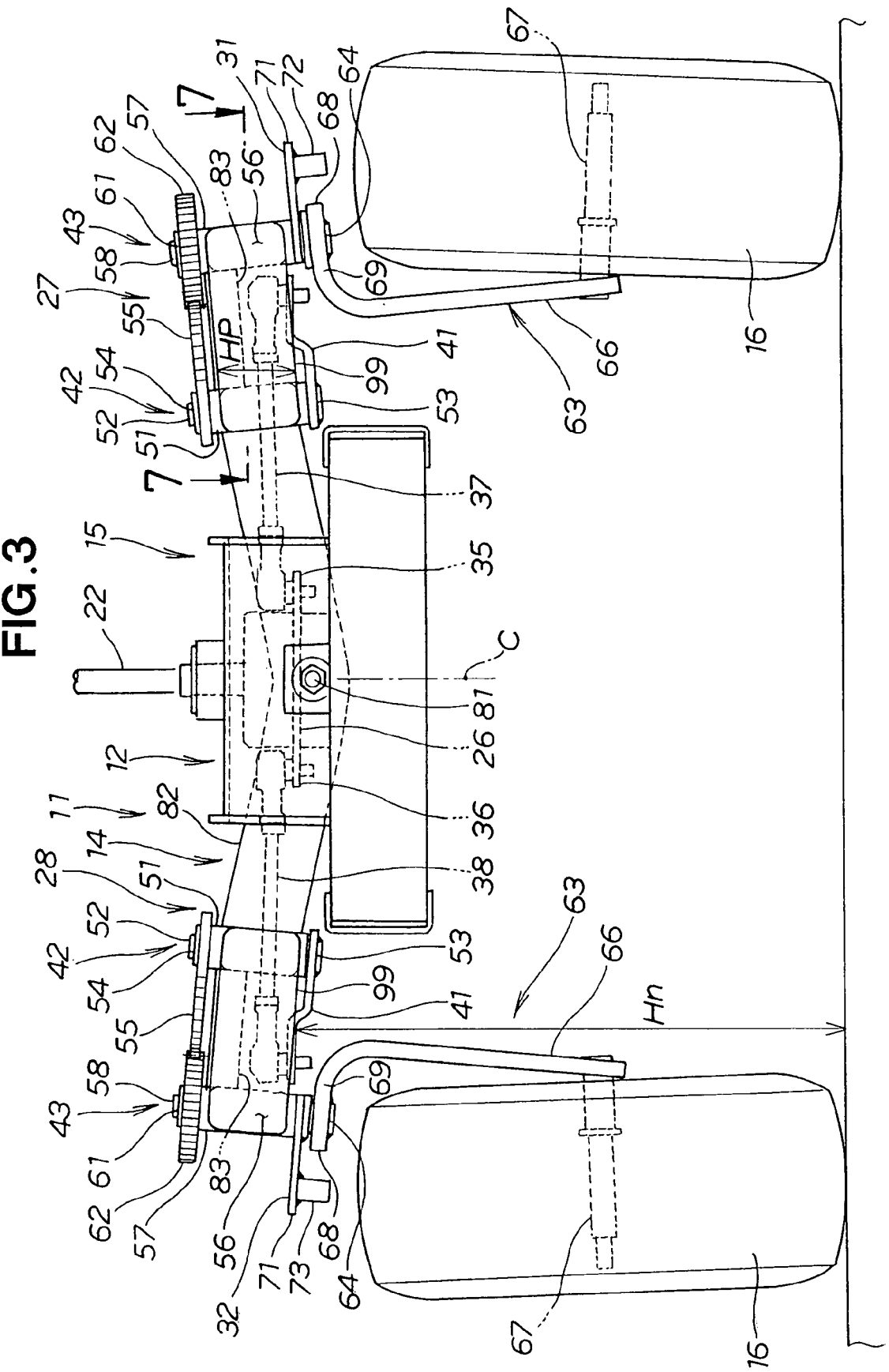
FIG. 3 is a front view of the vehicle shown in FIG. 1.
Figure 4:
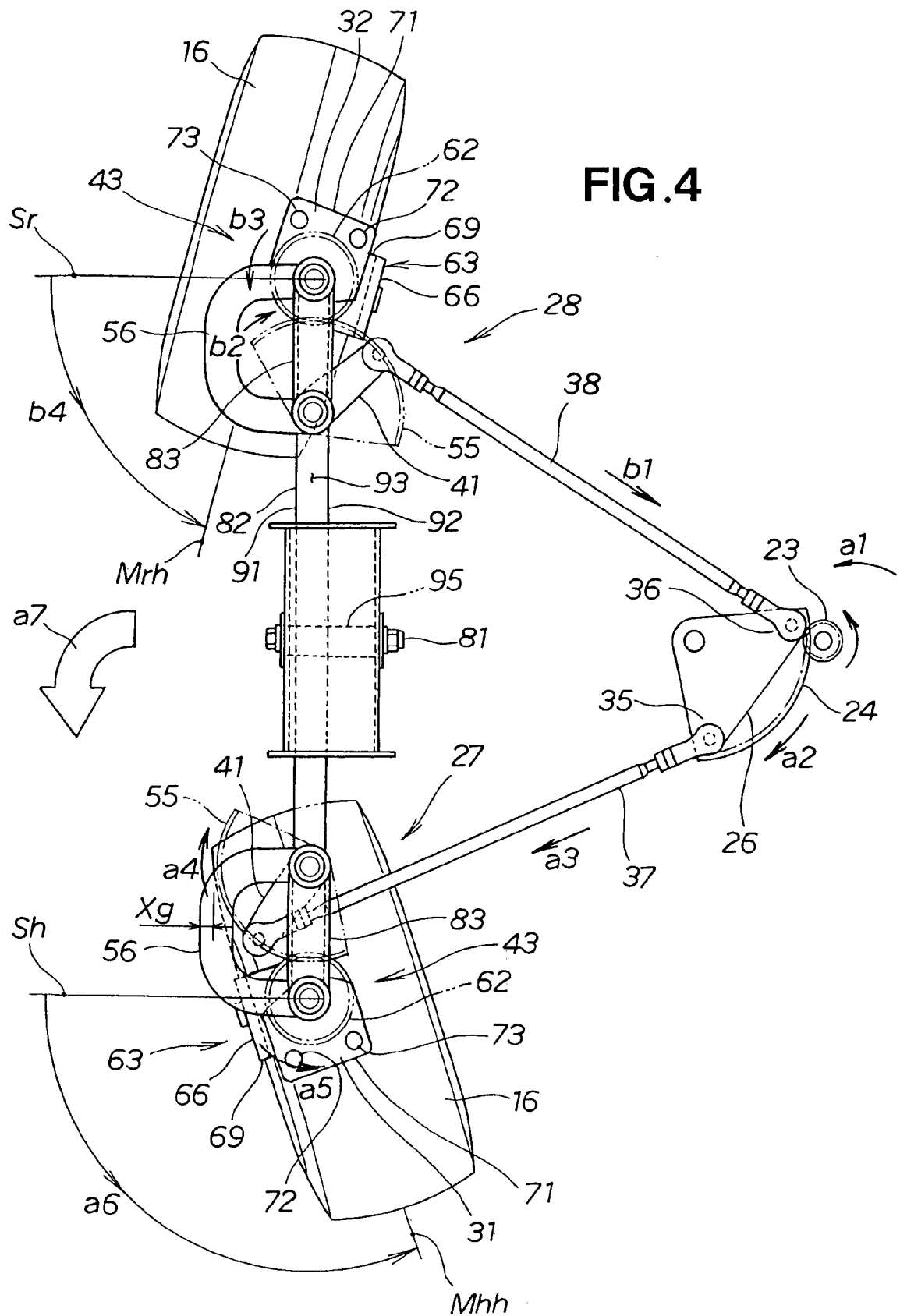
FIG. 4 is a top plan view showing the steering mechanism as the vehicle is turned to the left.

The fourth side wall 99 corresponds to the bottom surface of the side arm 56, and is at a position equivalent to the height Hn of the knuckle arm 41 above the ground, as shown in FIG. 3. The height of the side arms 56 is Hp.

The input side leg parts 111, protecting parts 112, and the output side leg parts 113 of the side arms 56 (including the input bearing boss 51 and the output bearing boss 57) form a space E having height Hp, width W, and length Lp in the longitudinal direction. The knuckle arm 41 is disposed in the space E.

The side arm 56 protrudes beyond the fan-shaped input gear 55 in the forward direction of the vehicle 11 by a distance Xg. Therefore, the input gear 55 and the output gear 62 are protected from obstructions 116, 117 in front of the vehicle 11.

In the embodiment, an example was described in which the side arms 56 have a U-shape as viewed from above, but the side arms may be formed in a shape other than a U-shape. For example, a V-shape, H-shape, or semi-circular shape may be used.

The knuckle arm 41 in the steering acceleration gear mechanism 27 is disposed at the lower end of the input/output bearing bosses 51, 57. However, the knuckle arm 41 may be disposed at the upper end, and may also be disposed at the bottom end of the input gear 55 and output gear 62.

Figure 8:
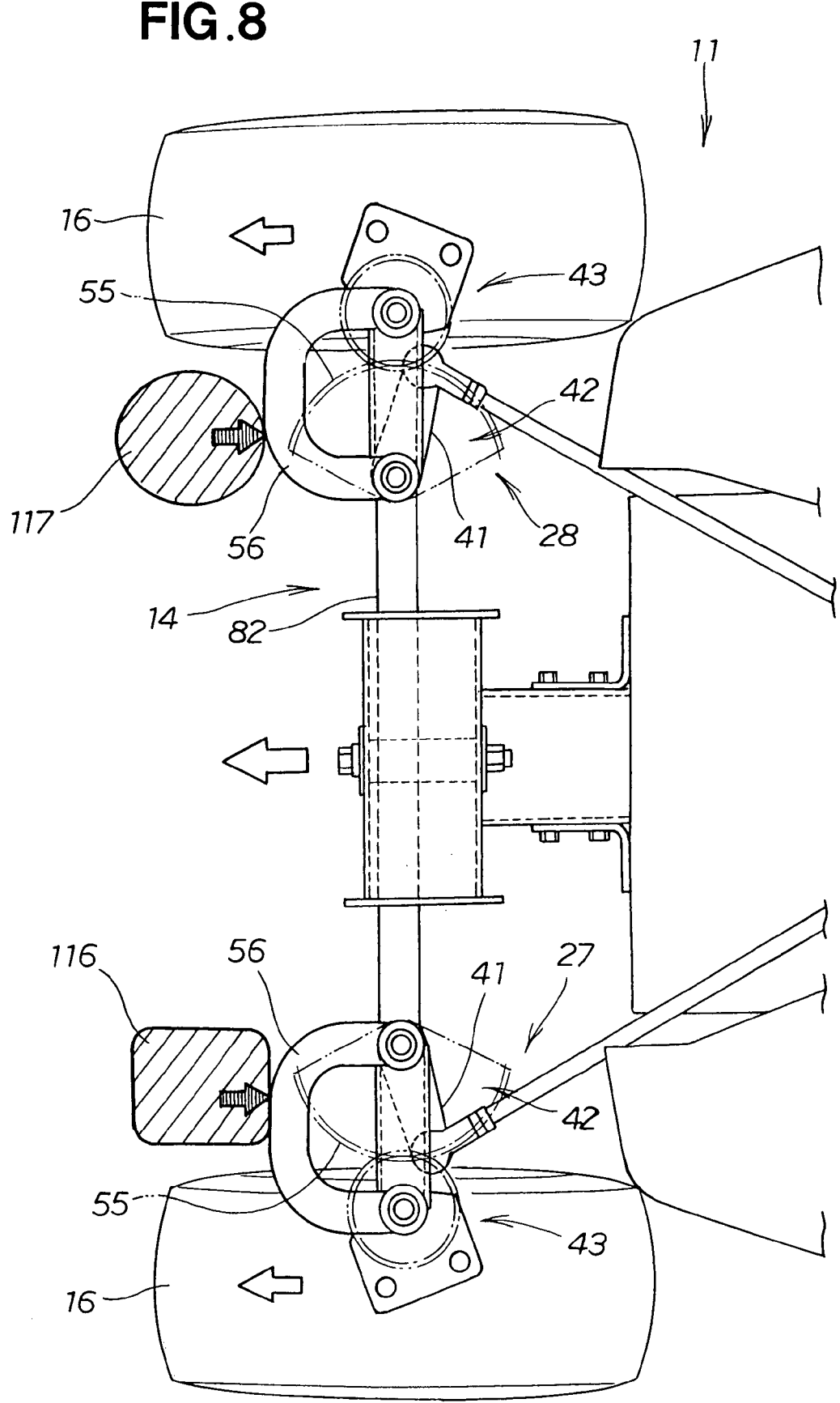
FIG. 8 is a view showing a state in which the steering acceleration gear mechanism is protected from obstructions.
Figure 9:
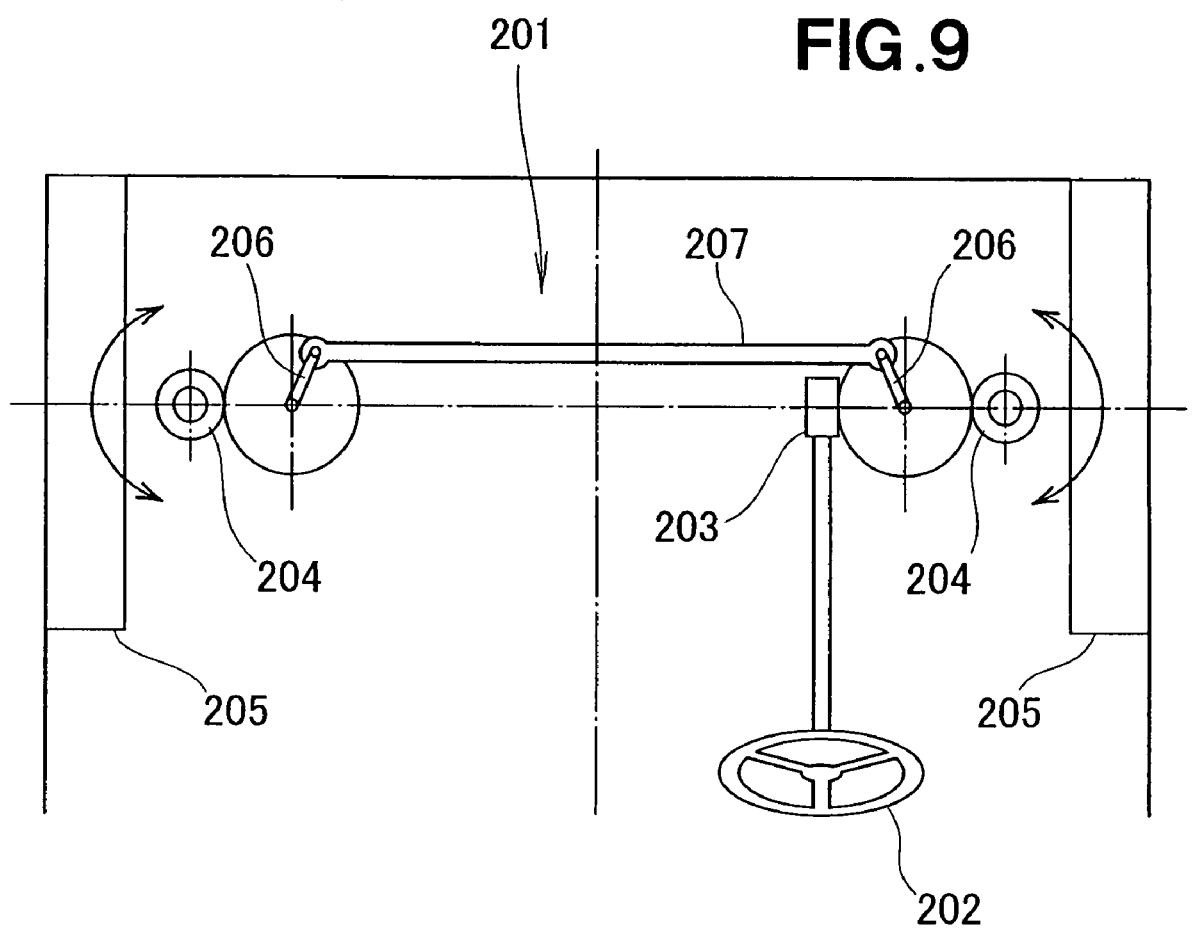
FIG. 9 is a schematic view showing a conventional steering mechanism.

FIG. 8 shows a state in which the steering acceleration gear mechanism is protected from obstructions.

Even if the vehicle 11 has a non-head-on collision with obstructions 116, 117 while traveling forward as shown by the arrows, the side arms 56 will come into contact with the obstruction 116 or obstruction 117. Therefore, the left and right steering acceleration gear mechanisms 27, 28 and the knuckle arm 41 will be protected from the obstructions 116, 117.

The steering mechanism 15 is thus provided with left and right input gear mechanisms 42, 42, left and right output gear mechanisms 43, 43, and left and right knuckle arms 41, 41 that are connected to the left and right input gear mechanisms 42, 42 and turn left and right input gears 55, 55. A suspension arm 14 protrudes further in the forward direction of the vehicle 11 than the left and right steering acceleration gear mechanisms 27, 28. Therefore, the suspension arm 14 will protect the left and right steering acceleration gear mechanisms 27, 28 from obstructions 116, 117 in front of the vehicle 11 even if the input gears 55, 55 of the left and right input gears mechanisms 42, 42 are made to rotate by the rotation of the left and right knuckle arms 41, 41.

The left and right knuckle arms 41, 41 of the left and right steering acceleration gear mechanisms 27, 28 are disposed at the bottom end of the input bearing bosses 51, 51, and in the space E described by the input bearing bosses 51, 51 and the output bearing bosses 57, 57. Therefore, the side arms 56 that describe the space E protect the knuckle arms 41, 41 of the left and right steering acceleration gear mechanisms 27, 28 from the obstructions 116, 117 in front of the vehicle 11.

The input gear 55 and output gear 62 of the steering acceleration gear mechanism 27 are positioned above the side arms 56, and are therefore exposed relative to the side arms 56. The input gear 55 and the output gear 62 can accordingly be inspected and maintained without intensive labor.

Since the knuckle arm 41 and the input gear 55 are mounted on the same input shaft 52, the area in which the gear turns is reduced. The knuckle arm 41 and the input gear 55 are also protected by the protecting parts 112 of the suspension arm 14.

The side arms 56 of the suspension arm 14 are connected to the beam members 83 fixed between the upper portions of the input bearing boss 51 and the output bearing boss 57, and are accordingly reinforced. The side arms 56 are formed in a U-shape so as to provide clearance for the knuckle arms 41. Therefore, the knuckle arms 41 are protected from the top and sides by the side arms 56 and the beam members 83.

In the present embodiment, an example was described in which the steering mechanism was used in lawn tractor. However, the present invention is not limited thereto, and may be used in, e.g., golf carts; other types of tractors; utility vehicles; moving vehicles such as those used in airports, hospitals, and other interior spaces; and vehicles used for healthcare-related applications.

Obviously, various minor changes and modifications of the present invention are possible in light of the above teaching. It is therefore to be understood that within the scope of the appended claims the invention may be practiced otherwise than as specifically described.

What is claimed is:

1. A steering mechanism comprising:
a suspension arm extending laterally of a vehicle; and
steering acceleration gear mechanisms mounted on left and right ends of the suspension arm designed to steer wheels via a force from a steering wheel of the vehicle, wherein each of the steering acceleration gear mechanisms has an input gear mounted on a left or right end of the suspension arm, an output gear that meshes with the input gear and has a smaller radius than that of the input gear, and a knuckle arm to which the force from the steering wheel is transmitted to rotate the input gear, the suspension arm has a portion that protrudes further forwardly of the vehicle than the steering acceleration gear mechanisms, the suspension arm has a central arm part designed to be connected to a frame of the vehicle, and side arm parts mounted to left and right ends of the central arm part, the side arm parts are U-shaped as viewed in top plan so as to provide clearance around the knuckle arm, one leg part of each said side arm part is mounted to an input bearing boss accommodating an input shaft which is a rotational center of the associated input gear, another leg part of each said side arm part is mounted to an output bearing boss accommodating an output shaft which is a rotational center of the associated output gear, and the side arm parts protrude further forwardly of the vehicle than the steering acceleration gear mechanisms.

2. The steering mechanism of claim 1, wherein each said knuckle arm is disposed in a space formed closely to a lower end of the associated input bearing boss between the input bearing boss and the associated output bearing boss.

3. The steering mechanism of claim 1, wherein each said side arm part has a lower end located at a position equivalent to a heightwise position from the ground of the associated knuckle arm.

4. The steering mechanism of claim 1, wherein each said knuckle arm is disposed at a position below the associated steering acceleration gear mechanism.

5. The steering mechanism of claim 1, wherein pockets are formed rearwardly of protruding portions of the side arm parts and the knuckle arms are disposed within the pockets, respectively.

* * * * *